United States Patent [19]
Besenfelder

[11] 3,832,684

[45] Aug. 27, 1974

[54] APPARATUS FOR DETECTING DATA BITS AND ERROR BITS IN PHASE ENCODED DATA

[75] Inventor: Edward R. Besenfelder, Phoenix, Ariz.

[73] Assignee: Honeywell Information Systems Inc., Waltham, Mass.

[22] Filed: Oct. 31, 1973

[21] Appl. No.: 411,493

[52] U.S. Cl. ................. 340/146.1 AB, 340/146.1 F
[51] Int. Cl. ............................................ G06k 5/00
[58] Field of Search .............. 340/146.1, 146.1 AB, 340/146.1 F; 360/26, 42, 53; 179/100.2 B, 100.2 S

[56] References Cited

UNITED STATES PATENTS

| | | | |
|---|---|---|---|
| 3,335,224 | 8/1967 | Meslener et al. | 340/146.1 AB |
| 3,529,290 | 9/1970 | Schroeder et al. | 340/146.1 AB |
| 3,729,708 | 4/1973 | Wolfer et al. | 340/146.1 F |
| 3,744,023 | 7/1973 | Carpentier et al. | 340/146.1 F |
| 3,755,731 | 8/1973 | Young | 360/26 |

*Primary Examiner*—Charles E. Atkinson
*Attorney, Agent, or Firm*—Lloyd B. Guernsey

[57] ABSTRACT

A plurality of JK flip-flops, inverters and logic gates provide error signals when errors in phase occur between the phase bits and the data bits of information retrieved from a magnetic medium. The apparatus also provides warning signals when data bits are missing from the retrieved information.

11 Claims, 3 Drawing Figures

APPARATUS FOR DETECTING DATA BITS AND ERROR BITS IN PHASE ENCODED DATA

BACKGROUND OF THE INVENTION

This invention relates to magnetic recording systems and more particularly to apparatus for detecting data bits and error bits in phase encoded data or information which is retrieved from a magnetic medium. The apparatus provides error signals when errors in phase occur between the phase bits and the data bits of the data retrieved from the magnetic medium. Warning signals are also provided when data bits are missing from the retrieved data.

In modern data processing systems data is stored on magnetic tapes or disks for retrieval and use at a later time. It is important that large quantities of data be stored as compactly as possible to minimize the number of reels of tape or the number of disks used when the data processing system. One of the techniques used to increase the quantity of data which can be stored in a given space is to use phase encoding. In phase encoding data bits are represented by change in the voltage level. For example, a binary one may be represented by an increasing signal voltage and a binary zero may be represented by a decreasing signal voltage. When a series of binary ones or a series of binary zeros are recorded it is necessary to include a "phase bit" between the binary ones or between the binary zeros. The phase bit may be used to synchronize the data with the oscillator in the processing system. This synchronization causes the data processing system to read the data at the time the signal voltage level changes so that noise voltages which occur at other times will not introduce errors into the data processing system. A preamble is recorded on the magnetic medium ahead of the data to aid in synchronizing the oscillator with the data being retrieved from the magnetic medium. It is important that any errors in the preamble be detected and a warning signal provided when these errors occur.

The data which is stored on the magnetic medium includes alphanumeric data characters each of which may include a total of nine bits. When magnetic tape is used the characters are stored or "written" sequentially on a plurality of tracks on the length of the magnetic tape which moves past a magnetic recording head assembly. These characters are recorded transversely along with the tape with one bit of a character written on each of the tracks by a plurality of magnetic heads in the head assembly. In a nine-track system nine heads simultaneously record nine bits of a data character with one bit in each of the nine tracks. When data is read from the magnetic tape, defects in the magnetic tape or noise in the subsystem may cause errors in the retrieved data. The presence of these errors may be detected by checking the format of the signal in each of the tracks. It is therefore necessary to provide an error signal whenever an error occurs in any of the tracks of data being read from the magnetic tape. It is also necessary to check the timing between the phase bit and the data bits and to provide an error signal when the phase bit is not properly spaced between the binary ones and binary zeros of the data.

It is, therefore, an object of this invention to provide new and improved apparatus for detecting data bits and error bits in phase encoded data which is stored on a magnetic medium.

Another object of this invention is to provide apparatus for detecting the absence of data being retrieved from a magnetic medium.

A further object of this invention is to provide new and improved apparatus for detecting errors in phase bits being retrieved from a magnetic medium.

Still another object of this invention is to provide apparatus for detecting errors in the preamble of the data.

A still further object of this invention is to provide apparatus for detecting loss of data in one of the data tracks of a magnetic medium.

Another object of this invention is to provide apparatus which develops an error signal when an end of preamble signal has been detected before the preamble itself has been detected.

A further object of this invention is to provide apparatus which checks the relative phase of the phase bit and the data bit and provides an error signal when there is improper timing between the phase bit and the data bit of the data retrieved from a magnetic medium.

SUMMARY OF THE INVENTION

The foregoing objects are achieved in the present invention by providing apparatus which detects the data bits and the error bits in phase encoded data retrieved from a magnetic medium. The relative times of the data bits and the phase bits are compared and an error signal develops when the phase between the two bits is incorrect. Warning signals are also provided when data bits are missing from the retrieved information and when errors occur in the preamble.

DESCRIPTION OF THE PREFERRED EMBODIMENT

Figure 1:
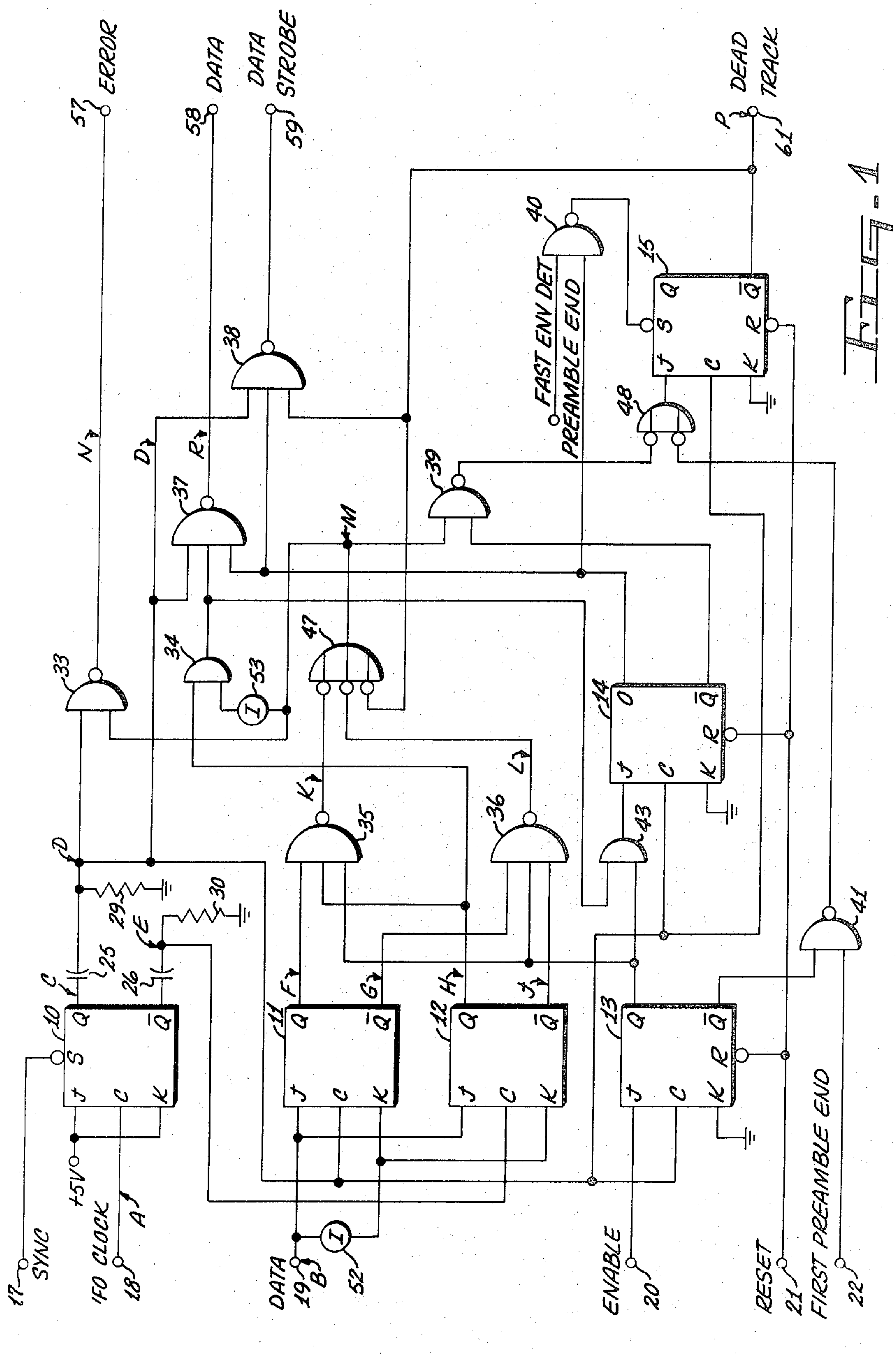
FIG. 1 is a block diagram of one embodiment of the present invention.
Figures 2, 3:
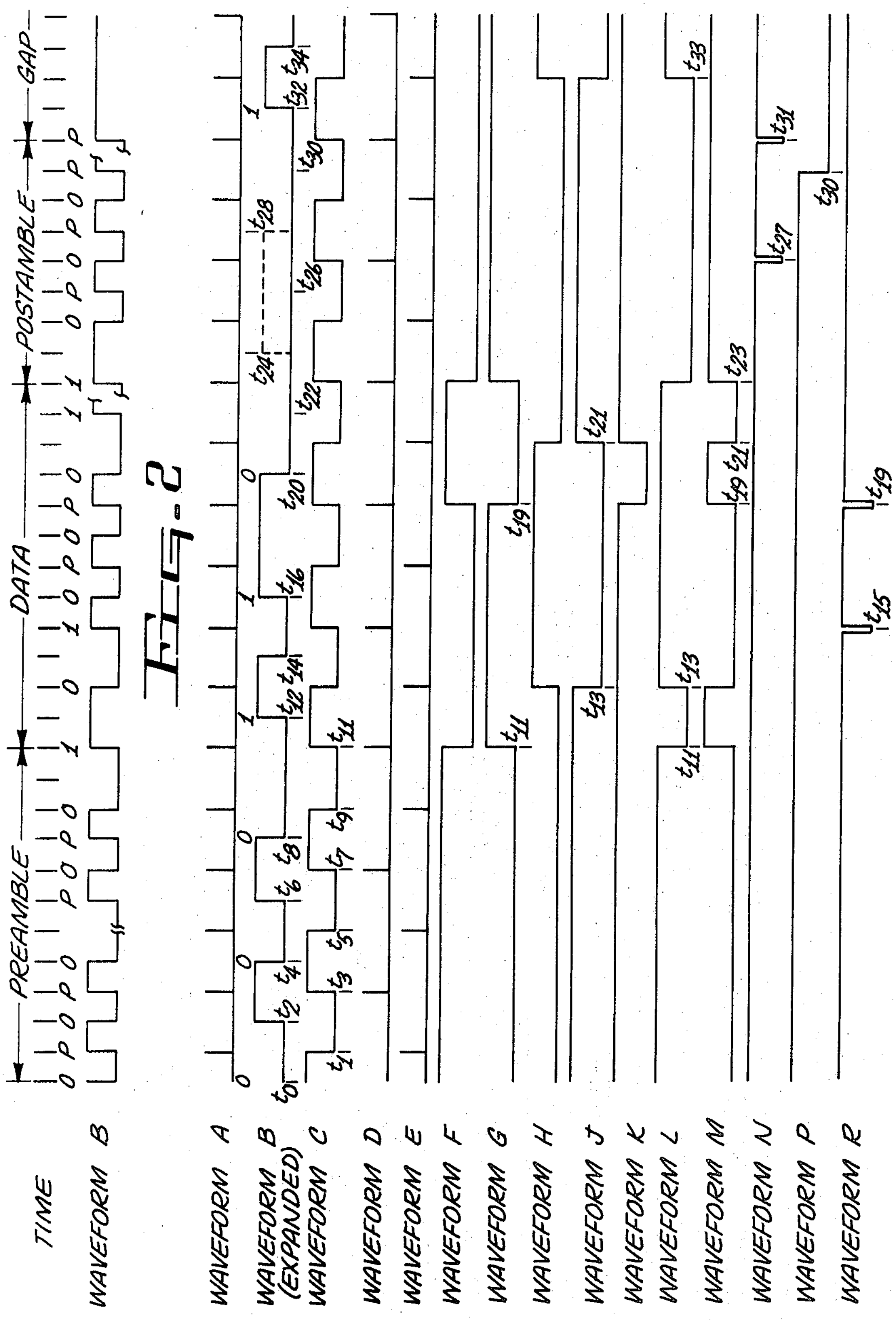
FIGS. 2 and 3 illustrate waveforms which are useful in explaining the operation of the invention shown in FIG. 1.

Each of the tracks of data provide VFO clock or timing signals, data signals and enable signals to input terminals 18, 19 and 20 of the apparatus of the type shown in FIG. 1. In a nine-track system nine of these circuits of FIG. 1 are used, with each one of the circuits receiving the signals from a corresponding one of the tracks. The data from each of the tracks is used to control the frequency of a corresponding controlled oscillator and to develop the VFO clock signal which is applied to the signal input terminal 18 of the corresponding circuit. The operation of the controlled oscillator is more fully described in a patent application filed May 30, 1972, entitled "Phase Locked Oscillator," Ser. No. 260,335 by Edward R. Besenfelder and assigned to the assignee of the present invention. The data which may be recovered from one of the tracks of the magnetic medium is shown in waveform B of FIG. 2. The data shown in waveform B is divided into four major parts comprising: the preamble which includes 40 zeros followed by a binary one, the information portion which may have both binary ones and binary zeros along with a phase bit, a postamble which comprises a binary one followed by 40 binary zeros, and a gap or space between the records of data. The gap is represented by a continuously low value of voltage. Marks representing even intervals of time are shown at the top of FIG. 2. It will be noted that a data bit may be alternated with a phase bit. When the data bit is a binary zero the voltage is decreasing during the data time and when the data bit is a binary one the voltage is increasing during the data time. The phase bit is included only when it is necessary to change the level of the waveform B in order to provide a new data bit. Immediately under the time intervals, 0's, 1's and *p*'s are used to show when binary zeros, binary ones and phase bits are included in waveform B.

The data portion of waveform B of FIG. 2 has been expanded in the waveform B (expanded) of FIG. 3 to more clearly show the timing between the data waveform and other signals used in the circuit of FIG. 1. The VFO clock pulses of waveform A shown in FIG. 3 are positioned near the center of each of the binary ones and binary zeros shown in the expanded waveform B. The circuit provides an error signal at output terminal 57 whenever an error occurs in the data of the track which is connected to the circuit shown on FIG. 1. The circuit of FIG. 1 provides data at the output terminal 58 and data strobe or data timing pulses at output terminal 59 whenever the data is coupled to input terminal 19 without any errors occurring in the data. Whenever there is a space in the track with no data being received by the circuit of FIG. 1 a low value of warning signal voltage is supplied to the "dead track" output terminal 61 of FIG. 1.

The signals at input terminals 18–22 are coupled to a plurality of JK flip-flops 10–15, to inverter 52, and NAND-gate 41. The JK flip-flop or binary multivibrator referred to in the specification, and shown, for example in FIG. 1 of the drawings, is a circuit adapted to operate in either one of two stable states and to transfer from the state in which it is operating to the other stable state upon the application of a trigger signal thereto. In one state of operation the JK flip-flop represents the binary one (1-state) and in the other state, the binary zero (0-state). The three leads entering the left-hand side of the flip-flop symbol provide the required trigger signals. The upper lead, the J lead, provides a set signal, the lower lead, the K lead, provides a reset input signal and the center lead provides the trigger signal. When the set input signal on the J lead, is positive, and the reset signal on the K lead is zero, a positive trigger signal on the C lead causes the flip-flop to change to the 1-state, if it is not already in the 1-state. When the reset signal is positive and the set signal zero, a positive signal also causes the flip-flop to transfer to the 0-state if it is not already in the 0-state.

When the J and K input leads are both positive, or when the J and K input leads are not connected to an external signal source, a positive signal pulse causes the flip-flop to change states. The S lead entering the top of the flip-flop and the R lead entering the bottom of the flip-flop also provide set and reset signals respectively. When a zero voltage potential is provided to the S lead the flip-flop sets to the 1-state and remains in the 1-state as long as the zero voltage potential remains on the S lead irrespective of any signals on the J, C and K leads. When a zero voltage potential is applied to the R lead the flip-flop resets to the zero state and remains in the 0-state as the voltage potential remains on the R lead irrespective of the voltage on the J, C and K leads. Some flip-flops do not use these S and R leads, for example, flip-flops 11 and 12 in FIG. 1 do not use either the S lead or the R lead. The two leads leaving the right-hand side of the flip-flop deliver the output signals for each flip-flop. The upper output lead, the Q lead, delivers the one output signal of the flip-flop and the Q output lead delivers the zero output signals.

An inverter provides the logical operation of inversion for an input signal applied thereto. The inverter provides a positive output signal representing the binary one when the input signal applied thereto is zero, representing a binary zero. Conversely, the inverter provides an output signal representing a binary zero when the input signal represents a binary one. Such an inverter is shown in FIG. 1 and is represented by the reference numeral 52.

The NAND-gates 35–41 disclosed in FIG. 1 provide a logical NAND function for input logic signals applied to its input leads. In the system disclosed, a binary one is represented by a positive signal, the NAND-gate provides an output signal of approximately zero volts representing a binary zero, when and only when all of the input signals applied to its input lead are positive and represent binary ones. Conversely, the NAND-gate provides a positive output signal representing a binary one when any one or more of the input signals applied thereto represent binary zeros. The NOR-gates 47 and 48 provide an output signal representing a binary one, when any one or more of the input signals applied thereto represent binary zeros. When none of the input signals represent binary zeros, the output signal represents a binary zero.

The circuit shown in FIG. 1 removes the preamble signals of FIG. 2 from the data and provides the data portion of the signal to the output terminal 58. The circuit of FIG. 1 also prevents the clock or timing pulses from appearing at the output terminals 57, 58 and 59 when there is no data on the input terminal 19.

The operation of the circuit shown in FIG. 1 will now be described in connection with the waveform shown in FIGS. 2 and 3. Flip-flops 13, 14 and 15 are reset by a signal on input terminal 21 when power is initially applied to the circuit and are also reset at the end of each postamble. When approximately twenty of the forty preamble pulses have been received by a detector circuit (not shown) the detector circuit provides a positive "enable" signal to input terminal 20 thereby causing flip-flop 13 to be set by the timing pulse on the C input lead. When the flip-flop 13 is set the flip-flop provides a positive voltage from the Q output lead which enables the error checking gates 35 and 36. This positive voltage from the Q output lead of flip-flop 13 also enables the AND-gate 43 which is coupled to the J input of the preamble end detect flip-flop 14. When a binary one at the end of the preamble is coupled to the data input terminal 19 this causes flip-flop 12 to be set by a pulse from the Q output lead of flip-flop 10. If flip-flop 15 is still reset a high value of voltage from the Q output lead of the dead track flip-flop 15 is coupled to the lower input lead of NOR-gate 47. If there are no errors in timing between the data bits and the phase bits gates 35 and 36 also provide high values of voltage to the input lead of NOR-gate 47 causing gate 47 to provide a low value of voltage to the input lead of inverter 53 causing inverter 53 to provide a positive value of voltage to the lower input lead of AND-gate 34 thereby enabling gate 34. Gate 34 provides a positive voltage to the upper input lead of AND-gate 43 thereby causing the "preamble end" flip-flop 14 to be set. When flip-flop 14 is set a positive voltage at the Q output lead of flip-flop 14 enables gates 37, 38 and 40.

The data which is applied to input terminal 19 is also applied to a fast envelope detector (not shown) which develops a positive voltage whenever data is no longer recovered from the track for a space of two or more character periods. This voltage from the fast envelope detector is applied to the input terminal 23 thereby causing NAND-gate 40 to provide a set signal to the "dead track" flip-flop 15. The set signal causes the flip-flop 15 to provide a low value of voltage at the Q output lead which provides a dead track signal to the output terminal 61 thereby providing a warning signal to indicate that one of the tracks of the retrieved information on the magnetic medium does not provide data to the circuit of FIG. 1.

The circuit of FIG. 1 also provides a dead track signal when any of the plurality of tracks of data provides an end of preamble signal to input terminal 22 before the enable signal is applied to the input terminal 20 of flip-flop 13. If a signal has not been applied to input terminal 20 flip-flop 13 is reset so that NAND-gate 41 is enabled and the "first preamble end" signal from terminal 22 is coupled through gate 41 and 48 to the J input lead of flip-flop 15 thereby causing flip-flop 15 to be set and provide a dead track signal to output terminal 61.

The VFO clock or VFO timing signals to input terminal 18 cause the flip-flop 10 to "toggle" or change between the set and the reset states each time a pulse is received on the C input lead of flip-flop 10. To ensure that the state of the flip-flop 10 is properly synchronized with the incoming data a sync signal applied to the input terminal 17 causes the flip-flop 10 to be held in a set state until the voltage on the input terminal 17 is removed. This signal on terminal 17 is removed so that flip-flop 10 is reset at time *t*1 of waveforms B and C of FIG. 3. Time *t*1 is a time immediately following the first data time of *t*0. The flip-flop 10 must be synchronized so that waveform C decreases between time *t*0 and time t2.

Flip-flops 11 and 12 and gates 35 and 36 provide error signals from gate 47 whenever a data bit is missing or whenever noise causes an extra bit to appear in the data. An error signal is also developed at gate 47 whenever the phase bit is missing in waveform B. Any combination of noise signals or missing bits that cause flip-flops 11 and 12 to be set at the same time or cause both to be reset at the same time will cause gate 47 to provide an error signal. The signals from gate 47 are sampled by pulses from the Q output lead of flip-flop 10. The pulses from flip-flop 10 enable gate 33 so the signals from gate 47 are coupled to output terminal 57 during the time each pulse from flip-flop 10 is positive. For example, at times *t*2, *t*6, *t*10, *t*14 and *t*18 a phase bit should be included in the waveform B between the data bits at *t*0, *t*4, *t*8, *t*12 and *t*16. However, there are no phase bits or changes in level of the expanded waveform B at times *t*10 and *t*18 because the data changes from a binary zero to a binary one or from a binary one to a binary zero. The missing phase bit at times *t*10 causes flip-flop 11 to reset at time *t*11 so that gate 36 is enabled by signals from the Q output lead of flip-flop 11 and by the Q output lead of flip-flop 12 causing gate 36 to provide the low value of voltage as shown in waveform L at time *t*11. Another low value of voltage is also provided by gate 36 at time *t*18. However, these signals are not coupled to the output terminals because gate 33 and 37 are disabled at these times. At times *t*3 and *t*7 waveform D applied to the C input lead of flip-flop 11 does not cause the flip-flop to change states as the data voltage applied to the J input lead has a positive value so that the flip-flop remains in a set state.

The binary zeros from time t0 through time t11 are coupled through the gate 37 to the output terminal 58 of FIG. 1. The pulses from waveform D are applied to the "phase" flip-flop 11 to sample the phase bits and the pulses of waveform E are applied to the C input lead of the "data" flip-flop 12 to sample the data information. For example, at times *t*1, *t*5 and *t*9 binary zeros are applied to the J input lead of data flip-flop 12 so that flip-flop 12 remains in a reset state. At time *t*13 a positive voltage on the J input lead of flip-flop 12 and the positive pulse on the C input lead cause flip-flop 12 to be set so that a positive voltage is developed at the Q output lead of flip-flop 12 as shown in waveform H. The positive voltage from the Q output lead of flip-flop 12 is applied to the upper input lead of gate 34 which is enabled by the signal from gate 47 and inverter 53 thereby providing a positive voltage to the center input lead of NAND-gate 37. At time t15 a positive pulse from the Q output lead of flip-flop 10 causes the pulse of waveform D to be coupled through NAND-gate 37 to the data output lead 58. Thus, the binary ones which are applied to the data input lead 19 are coupled through the data flip-flop 12 through gates 34 and 37 and appear as negative pulses on the data output terminal 58.

An example of errors in the data is shown at time *t*24 to *t*28 of the expanded waveform B. The dotted lines show that a data pulse which should be included in the waveform is missing. The loss of data causes gate 36 to provide a signal to gate 47. The low value of signal of waveform B expanded causes flip-flop 12 to reset at time *t*21 and causes flip-flop 11 to reset at time *t*23. These flip-flops provide high values of signal to gate 36 causing the voltage on the output lead of gate 36 to go low. The low voltage from gate 36 causes gate 47 to provide a positive value of signal to inverter 53 which provide a low value of voltage to gate 34. The low value of voltage on gate 34 causes gate 34 to provide a low value of voltage which disables gate 37. When gate 37 is disabled a high value of voltage representing binary zeros is coupled to output terminal 58.

The loss of data between time *t*24 and time *t*28 is greater than two character times a fast envelope detector (not shown) provides a positive voltage to the input terminal 23 which is connected to NAND-gate 40. The fast envelope detector signal is coupled through gate 40 to the set input lead of flip-flop 15 thereby setting flip-flop 15 and providing a low value of voltage at the Q output lead of flip-flop 15. The low value of the signal at the Q output lead of flip-flop 15 disables NAND-gate 38 so that the data strobe pulses are no longer coupled to the output terminal 59 and also provide a low value of voltage to the lower input lead of NOR-gate 47 thereby causing gate 47 to provide a high value of voltage on the output lead of gate 47 as shown at time *t*23 of waveform M. The voltage from the output lead of gate 47 is coupled to the lower input lead of NAND-gate 33 thereby enabling gate 33 so that the pulses of waveform D are coupled through gate 33 and appear as negative pulses at times *t*27 and *t*31 on the error output terminal 57 as shown in waveform N. The negative pulses on the error output terminal 57 provide warning signals to the remaining portion of the data processing system.

While the principles of the invention have now been made clear in an illustrative embodiment, there will be many obvious modifications of the structure, proportions, materials and components without departing from those principles. The appended claims are intended to cover any such modifications.

I claim:

1. Apparatus for detecting data bits and error bits in phase encoded data, for use with a source of data, a source of timing pulses, a source of enable signals and a source of preamble end signals, said apparatus comprising:

first, second, third and fourth flip-flops each having first, second and third input leads and first and second output leads, said second input lead of said first flip-flop being coupled to said source of pulses, said first and said third input leads of said second and said third flip-flops each being coupled to said source of data, said first input lead of said fourth flip-flop being coupled to said source of said enable signals, said first output lead of said first flip-flop being coupled to said second input lead of said second and said fourth flip-flops, said second output lead of said first flip-flop being coupled to said second input lead of said third flip-flop;

first and second reference potentials, said first potential being connected to said first and said third input leads of said first flip-flop, said second potential being connected to said third input lead of said fourth flip-flop;

first and second logic gates each having first, second and third input leads and an output lead, said first, second and third input leads of said first gate being connected to a corresponding one of said first output leads of said second, third and fourth flip-flops, said first input lead of said second gate being connected to said first output lead of said fourth flip-flop, said second input lead of said second gate being connected to said second output lead of said second flip-flop, said third input lead of said second gate being connected to said second output lead of said third flip-flop;

first gating means for providing an error signal when one of said first and said second logic gates is enabled, said first gating means being coupled to said output lead of first logic gate, to said output lead of second logic gate and to said first output lead of said first flip-flop.

2. Apparatus for detecting data bits and error bits in phase encoded data, for use with a source of data and a source of timing pulses, said apparatus comprising:

first and third flip-flops each having first, second and third input leads and an output lead, said second input lead of said first flip-flop being connected to said source of pulses, said first and said third input leads of said third flip-flop being coupled to said source of data, said second input lead of said third flip-flop being coupled to said lead of said first flip-flop;

a gating means, said gating means being coupled to said output lead of said first flip-flop and to said output lead of said third flip-flop; and a first reference potential, said first potential being coupled to said first and said third input leads of said first flip-flop.

3. Apparatus for detecting data bits and error bits in phase encoded data, for use with a source of data, a source of timing pulses and a source of enable signals, said apparatus comprising:

first, third, fourth and fifth flip-flops each having first, second and third input leads and first and second output leads, said second input lead of said first flip-flop being connected to said source of pulses, said first and said third input leads of said third flip-flop being coupled to said source of data, said second input leads of said fourth and fifth flip-flops being coupled to said first output lead of said first flip-flop, said second input lead of said third flip-flop being coupled to said second output lead of said first flip-flop;

first and second reference potentials, said first reference potential being connected to said first and said third input leads of said first flip-flop, said second reference potential being connected to said third input lead of said fourth and said fifth flip-flops, said first input lead of said fourth flip-flop being coupled to said source of enable signals, said first output lead of said fourth flip-flop being coupled to said first input lead of said fifth flip-flop; and a gating means, said gating means being coupled to said first output lead of said third and said fifth flip-flops.

4. Apparatus for detecting data bits and error bits in phase encoded data, for use with a source of timing pulses, a source of enable signals and a source of preamble end signals, said apparatus comprising:

first, fourth and sixth flip-flops each having first, second and third input leads and first and second output leads, said second input lead of said first flip-flop being connected to said source of pulses, said first input lead of said fourth flip-flop being connected to said source of enable signals, said second input lead of said fourth and said sixth flip-flops being coupled to said first output lead of said first flip-flop;

first and second reference potentials, said first potential being coupled to said first and said third input leads of said first flip-flop, said second potential being connected to said third input lead of said fourth and said sixth flip-flops;

a logic gate having first and second input leads and an output lead, said first input lead of said logic gate being coupled to said second output lead of said fourth flip-flop, said second input lead of said logic gate being coupled to said source of preamble end signals, said output lead of said logic gate being coupled to said first input lead of said sixth flip-flop; and an output terminal, said output terminal being connected to said second output lead of said sixth flip-flop.

5. Apparatus for detecting data bits and error bits in phase encoded data, for use with a source of data, a source of timing pulses, a source of enable signals, a source of preamble end signals, and a source of fast envelope detect signals, said apparatus comprising:

first, fourth, fifth and sixth flip-flops each having first, second and third input leads, a set lead and first and second output leads, said second input lead of said first flip-flop being coupled to said source of pulses, said second input lead of said fourth, said fifth and said sixth flip-flops each being coupled to said first output lead of said first flip-flop, said first input lead of said fourth flip-flop being coupled to said source of enable signals, said first input lead of said fifth flip-flop being coupled to said first output lead of said fourth flip-flop, first and second reference potentials, said first potential being connected to said first and said third input leads of said first flip-flop, said second potential being connected to said third input leads of said fourth, said fifth and said sixth flip-flops;

a first gating means having first and second input leads and an output lead, said first input lead of said first gating means being connected to said source of fast envelope detect signals, said second input lead of said first gating means being coupled to said first output lead of said fifth flip-flop, said output lead of said first gating means being coupled to said set input lead of said sixth flip-flop; and an output terminal, said output terminal being connected to said second output lead of said sixth flip-flop.

6. Apparatus for detecting data bits and error bits in phase encoded data as defined in claim 5 including:

a second gating means having first and second input leads and an output lead, said first input lead of said second logic gate being connected to said second output lead of said fourth flip-flop, said second input lead of said second gating means being coupled to said source of preamble end signals, said output lead of said second gating means being coupled to said first input lead of said sixth flip-flop.

7. Apparatus for detecting data bits and error bits in phase encoded data, for use with a source of data, a source of timing pulses, a source of enable signals, a source of preamble end signals, and a source of fast envelope detect signals, said apparatus comprising:

first, second, third, fourth, fifth, and sixth flip-flops each having first, second, third and set input leads and first and second output leads, said second input lead of said first flip-flop being connected to said source of timing pulses, said first output lead of said first flip-flop being connected to said second input lead of said second, said fourth, said fifth and said sixth flip-flops, said second output lead of said first flip-flop being connected to said second input lead of said first flip-flop being connected to said second input lead of said third flip-flop, said first and said third input leads of said second and said third flip-flops each being coupled to said source of data, said first input lead of said fourth flip-flop being coupled to said source of enable signals;

first, second and third logic gates each having first, second and third input leads and an output lead, said input leads of said first logic gate each being coupled to a corresponding one of said first output leads of said second, said third and said fourth flip-flops, said first and said second input leads of said second logic gate each being connected to a corresponding one of said second output leads of said second and said third flip-flops, said third input lead of said second logic gate being connected to said first output lead of said fourth flip-flop, said output lead of said first logic gate being connected to said first input lead of said third logic gate, said output lead of said second logic gate being connected to said second input lead of said third logic gate, said second output lead of said sixth flip-flop being connected to said third input lead of said third logic gate;

first and second reference potentials, said first potential being connected to said first and said third input leads of said first flip-flop, each second potential being connected to said third input lead of said fourth said fifth and said sixth flip-flops;

first gating means having first and second input leads and an output lead, said first input lead of said first gating means being connected to said output lead of said third logic gate, said second input lead of said first gating means being coupled to said second output lead of said fifth flip-flop, said output lead of said logic means being coupled to said first input lead of said sixth flip-flop, said first input lead of said fifth flip-flop being coupled to said first output lead of said fourth flip-flop; and an output terminal, said output terminal being connected to said second output lead of said sixth flip-flop.

8. Apparatus for detecting data bits and error bits in phase encoded data as defined in claim 7 including:

a second gating means having first and second input leads and an output lead, said first input lead of said second gating means being coupled to said source of fast envelope detect signals, said second input lead of said second gating means being connected to said first output lead of said fifth flip-flop, said output lead of said second gating means being connected to said set input lead of said sixth flip-flop.

9. Apparatus for detecting data bits and error bits in phase encoded data as defined in claim 7 including:

a third gating means having first and second input leads and an output lead, said first input lead of said third gating means being connected to said second output lead of said fourth flip-flop, said second input lead of said third gating means being coupled to said source of preamble end signals, said output lead of said third gating means being coupled to said first input lead of said sixth flip-flop.

10. Apparatus for detecting data bits and error bits in phase encoded data as defined in claim 7 including:

second and third gating means each having first and second input leads and an output lead, said first input lead of said second gating means being coupled to said source of fast envelope detect signals, said second input lead of said second gating means being connected to said first output lead of said fifth flip-flop, said output lead of said second gating means being connected to said set input lead of said sixth flip-flop, said first input lead of said third gating means being connected to said second output lead of said fourth flip-flop, said second input lead of said third gating means being coupled to said source of preamble end signals, said output lead of said third gating means being coupled to said first input lead of said sixth flip-flop.

11. Apparatus for detecting data bits and error bits in phase encoded data as defined in claim 7 including:

second and third gating means each having first and second input leads and an output lead, said first input lead of said second gating means being coupled to said source of fast envelope detect signals, said second input lead of said second gating means being connected to said first output lead of said fifth flip-flop, said output lead of said second gating means being connected to said set input lead of said sixth flip-flop, said first input lead of said third gating means being connected to said second output lead of said fourth flip-flop, said second input lead of said third gating means being coupled to said source of preamble end signals, said output lead of said third gating means being coupled to said first input lead of said sixth flip-flop;

a fourth logic gate having first, second and third input leads and an output lead, said first input lead of said fourth logic gate being coupled to said first output lead of said first flip-flop, said second input lead of said fourth logic gate being connected to said output lead of said third logic gate, said third input lead of said fourth logic gate being connected to said second output lead of said sixth flip-flop; and a second output terminal, said second terminal being connected to said output lead of said fourth gating means.

* * * * *